(12) United States Patent
Olliphant et al.

(10) Patent No.: US 9,317,841 B2
(45) Date of Patent: Apr. 19, 2016

(54) METHOD AND SYSTEM FOR FACILITATING ONLINE PAYMENTS BASED ON AN ESTABLISHED PAYMENT AGREEMENT

(75) Inventors: Hugo Olliphant, San Francisco, CA (US); Franck Chastagnol, Redwood City, CA (US); Yi-Ling Su, Los Altos, CA (US); William Wu, San Francisco, CA (US); Chris Brown, Berkeley, CA (US); Thach Dang, Burlingame, CA (US); Thomas Veino, San Jose, CA (US); Carol Gunby, San Jose, CA (US); Peter Chu, Mountain View, CA (US); Steve Chen, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 13/458,855

(22) Filed: Apr. 27, 2012

(65) Prior Publication Data

US 2012/0215697 A1    Aug. 23, 2012

Related U.S. Application Data

(63) Continuation of application No. 10/873,704, filed on Jun. 21, 2004, now Pat. No. 8,175,938.

(60) Provisional application No. 60/562,065, filed on Apr. 13, 2004.

(51) Int. Cl.
*G06Q 40/00* (2012.01)
*G06Q 20/02* (2012.01)
(Continued)

(52) U.S. Cl.
CPC ............... *G06Q 20/02* (2013.01); *G06Q 20/10* (2013.01); *G06Q 20/102* (2013.01); *G06Q 20/12* (2013.01); *G06Q 40/00* (2013.01)

(58) Field of Classification Search
CPC ....... G06Q 10/10; G06Q 20/20; G06Q 33/00; G06Q 40/00; G06Q 10/00

USPC ........................................................ 705/3–44
See application file for complete search history.

(56) References Cited

U.S. PATENT DOCUMENTS

| 5,426,281 A | 6/1995 | Abecassis |
| 5,649,118 A | 7/1997 | Carlisle et al. |

(Continued)

FOREIGN PATENT DOCUMENTS

| GB | 2360380 A | 9/2001 |
| TW | 0381240 B | 2/2000 |

(Continued)

OTHER PUBLICATIONS

"U.S. Appl. No. 10/873,704, Advisory Action mailed Aug. 29, 2011", 2 pgs.

(Continued)

*Primary Examiner* — Frantzy Poinvil
(74) *Attorney, Agent, or Firm* — Schwegman, Lundberg & Woessner, P.A.

(57) ABSTRACT

A method and system for facilitating online payments are disclosed. According to one aspect of the present invention, a payment agreement is established at a payment service provider that defines terms of a payment relationship between a merchant and a user. The establishing of the payment agreement includes linking the payment agreement with a payment account of the merchant or user stored at the payment service provider. After establishing the payment agreement, a payment request associated with a transaction is received, whereby the payment request includes a unique identifier to identify the payment agreement stored at the payment service provider. Based on a verification that the payment request complies with terms of the payment agreement, the payment request is processed.

20 Claims, 6 Drawing Sheets

(51) Int. Cl.
  *G06Q 20/10* (2012.01)
  *G06Q 20/12* (2012.01)

(56) References Cited

U.S. PATENT DOCUMENTS

| | | | |
|---|---|---|---|
| 5,699,528 A | 12/1997 | Hogan | |
| 5,778,178 A | 7/1998 | Arunachalum | |
| 5,826,241 A | 10/1998 | Stein et al. | |
| 5,883,810 A | 3/1999 | Franklin et al. | |
| 5,903,830 A | 5/1999 | Joao et al. | |
| 5,903,878 A | 5/1999 | Talati et al. | |
| 5,920,847 A | 7/1999 | Kolling | |
| 5,987,500 A | 11/1999 | Arunachalam | |
| 6,018,724 A | 1/2000 | Arent | |
| 6,047,268 A | 4/2000 | Bartoli et al. | |
| 6,167,385 A | 12/2000 | Hartley-Urquhart | |
| 6,205,433 B1 | 3/2001 | Boesch et al. | |
| 6,212,556 B1 | 4/2001 | Arunachalam | |
| 6,314,519 B1 | 11/2001 | Davis et al. | |
| 6,336,114 B1 | 1/2002 | Garrison | |
| 6,473,740 B2 | 10/2002 | Cockrill et al. | |
| 6,901,387 B2 | 5/2005 | Wells et al. | |
| 6,934,692 B1 | 8/2005 | Duncan | |
| 6,996,542 B1* | 2/2006 | Landry | 705/40 |
| 7,013,001 B1 | 3/2006 | Felger | |
| 7,051,001 B1 | 5/2006 | Slater | |
| 7,240,031 B1 | 7/2007 | Kight et al. | |
| 7,353,203 B1 | 4/2008 | Kriplani et al. | |
| 7,537,153 B2* | 5/2009 | Hurwitz et al. | 235/379 |
| 7,627,526 B2 | 12/2009 | Williams et al. | |
| 7,660,766 B1* | 2/2010 | Lawson et al. | 705/40 |
| 7,742,994 B1* | 6/2010 | Gupta | 705/64 |
| 7,792,749 B2* | 9/2010 | Ganesan | 705/40 |
| 7,953,660 B2* | 5/2011 | Ganesan et al. | 705/40 |
| 8,175,938 B2 | 5/2012 | Olliphant et al. | |
| 8,352,364 B2* | 1/2013 | Reardon | 705/39 |
| 8,682,784 B2 | 3/2014 | Schleicher | |
| 8,738,517 B2 | 5/2014 | Bedier et al. | |
| 2002/0052841 A1 | 5/2002 | Guthrie et al. | |
| 2002/0087469 A1* | 7/2002 | Ganesan et al. | 705/40 |
| 2003/0154139 A1 | 8/2003 | Woo | |
| 2003/0163416 A1 | 8/2003 | Kitajima | |
| 2003/0216996 A1 | 11/2003 | Cummings et al. | |
| 2005/0075979 A1* | 4/2005 | Leavitt et al. | 705/40 |
| 2005/0177510 A1 | 8/2005 | Hilt et al. | |
| 2006/0036541 A1 | 2/2006 | Schleicher | |
| 2006/0036544 A1 | 2/2006 | Dharam | |
| 2006/0065717 A1* | 3/2006 | Hurwitz et al. | 235/381 |
| 2006/0122943 A1 | 6/2006 | Mann, III et al. | |
| 2007/0083460 A1 | 4/2007 | Bachenheimer | |
| 2007/0233599 A1* | 10/2007 | Ganesan et al. | 705/40 |
| 2007/0244809 A1 | 10/2007 | Meeks | |
| 2008/0040274 A1* | 2/2008 | Uzo | 705/44 |
| 2008/0140531 A1* | 6/2008 | Diveley et al. | 705/14 |
| 2008/0162366 A1 | 7/2008 | Bedier et al. | |
| 2012/0271761 A1* | 10/2012 | Kight et al. | 705/39 |
| 2014/0101038 A1* | 4/2014 | Ganesan | 705/40 |
| 2014/0172717 A1 | 6/2014 | Bedier et al. | |
| 2014/0195436 A1 | 7/2014 | Schleicher | |

FOREIGN PATENT DOCUMENTS

| | | | |
|---|---|---|---|
| TW | 498250 B | 8/2002 | |
| TW | 530230 B | 5/2003 | |
| TW | 532022 B | 5/2003 | |
| TW | 0544605 B | 8/2003 | |
| WO | WO-9703410 A1 | 1/1997 | |
| WO | WO-0067219 A1 | 11/2000 | |
| WO | WO-0118720 A1 | 3/2001 | |
| WO | WO-0184454 A1 | 11/2001 | |
| WO | WO-2004079603 A1 | 9/2004 | |
| WO | WO-2005101264 A2 | 10/2005 | |
| WO | WO-2005101264 A3 | 10/2005 | |
| WO | WO-2006019368 A2 | 2/2006 | |
| WO | WO-2006019368 A3 | 2/2006 | |

OTHER PUBLICATIONS

"U.S. Appl. No. 10/873,704, Appeal Brief filed Oct. 31, 2011", 36 pgs.

"U.S. Appl. No. 10/873,704, Decision on Pre-Appeal Brief Request mailed Oct. 17, 2011", 2 pgs.

"U.S. Appl. No. 10/873,704, Final Office Action mailed Apr. 15, 2010", 17 pgs.

"U.S. Appl. No. 10/873,704, Final Office Action mailed Jun. 9, 2011", 16 pgs.

"U.S. Appl. No. 10/873,704, Non Final Office Action mailed Jan. 5, 2011", 14 pgs.

"U.S. Appl. No. 10/873,704, Non Final Office Action mailed Mar. 23, 2009", 12 pgs.

"U.S. Appl. No. 10/873,704, Non Final Office Action mailed Sep. 16, 2009", 14 pgs.

"U.S. Appl. No. 10/873,704, Non-Final Office Action mailed Jan. 15, 2008", 3 pgs.

"U.S. Appl. No. 10/873,704, Non-Final Office Action mailed Aug. 4, 2010", 7 pgs.

"U.S. Appl. No. 10/873,704, Non-Final Office Action mailed Sep. 17, 2008", 15 pgs.

"U.S. Appl. No. 10/873,704, Notice of Allowance mailed Jan. 9, 2012", 8 pgs.

"U.S. Appl. No. 10/873,704, Pre-Appeal Brief Request mailed Sep. 9, 2011", 6 pgs.

"U.S. Appl. No. 10/873,704, Response filed Mar. 31, 2011 to Non-Final Office Action mailed Jan. 5, 2011", 23 pgs.

"U.S. Appl. No. 10/873,704, Response filed May 5, 2008 to Non-Final Office Action mailed Jan. 15, 2008", 22 pgs.

"U.S. Appl. No. 10/873,704, Response filed Jun. 18, 2009 to Non Final Office Action mailed Mar. 23, 2009", 23 pgs.

"Application U.S. Appl. No. 10/873,704, Response filed Jul. 15, 2010 to Final Office Action mailed Apr. 15, 2010", 22 pgs.

"U.S. Appl. No. 10/873,704, Response filed Jul. 27, 2011 to Final Office Action mailed Jun. 9, 2011", 23 pgs.

"U.S. Appl. No. 10/873,704, Response filed Oct. 28, 2010 to Non Final Office Action mailed Aug. 4, 2010", 17 pgs.

"U.S. Appl. No. 10/873,704, Response filed Dec. 16, 2009 to Non Final Office Action mailed Sep. 16, 2009", 22 pgs.

"U.S. Appl. No. 10/873,704, Response filed Dec. 17, 2008 to Non-Final Office Action mailed Sep. 17, 2008", 18 pgs.

"U.S. Appl. No. 10/941,510, Final Office Action mailed Feb. 7, 2008", 9 pgs.

"U.S. Appl. No. 10/941,510, Advisory Action mailed May 7, 2008", 3 pgs.

"U.S. Appl. No. 10/941,510, Advisory Action mailedAug. 5, 2010", Advisory Action, 3 pgs.

"U.S. Appl. No. 10/941,510, Amendment Under 37 C.F.R. mailed Sep. 9, 2008", 14 pgs.

"U.S. Appl. No. 10/941,510, Decision on Appeal Brief mailed Jul. 9, 2008", 2 pgs.

"U.S. Appl. No. 10/941,510, Final Office Action mailed May 13, 2010", 10 pgs.

"U.S. Appl. No. 10/941,510, Final Office Action mailed Jun. 3, 2009", 9 pgs.

"U.S. Appl. No. 10/941,510, Non Final Office Action mailed Oct. 7, 2011", 10 pgs.

"U.S. Appl. No. 10/941,510, Non Final Office Action mailed Jul. 10, 2007", 6 pgs.

"U.S. Appl. No. 10/941,510, Non-Final Office Action mailed Feb. 5, 2010", 10 pgs.

"U.S. Appl. No. 10/941,510, Non-Final Office Action mailed Oct. 6, 2008", 7 pgs.

"U.S. Appl. No. 10/941,510, Pre-Appeal Brief Request mailed Jun. 5, 2008", 5 pgs.

"U.S. Appl. No. 10/941,510, Response filed Apr. 7, 2008 to Final Office Action mailed Feb. 7, 2008", 11 pgs.

"U.S. Appl. No. 10/941,510, Response Filed Apr. 9, 2012 to Non-Final Office Action Received Oct. 7, 2011", 15 pgs.

"U.S. Appl. No. 10/941,510, Response filed Jul. 13, 2010 to Final Office Action mailed May 13, 2010", 9 pgs.

(56) References Cited

OTHER PUBLICATIONS

"U.S. Appl. No. 10/941,510, Response filed Sep. 26, 2007 to Non-Final Office Action mailed Jul. 10, 2007", 11 pgs.
"U.S. Appl. No. 10/941,510, Response filed Nov. 4, 2009 to Final Office Action mailed Jun. 3, 2009", 14 pgs.
"U.S. Appl. No. 10/941,510, Response filed Feb. 6, 2009 to Non Final Office Action mailed Oct. 6, 2008", 11 pgs.
"U.S. Appl. No. 10/941,510, Response filed Apr. 28, 2010 to Non Final Office Action mailed Feb. 5, 2010", 14 pgs.
"U.S. Appl. No. 11/618,700, Advisory Action mailed Mar. 1, 2012", 3 pgs.
"U.S. Appl. No. 11/618,700, Advisory Action mailed Mar. 26, 2009", 3 pgs.
"Application U.S. Appl. No. 11/618,700, Advisory Action mailed May 26, 2010", 4 pgs.
"U.S. Appl. No. 11/618,700, Appeal Brief filed Jun. 28, 2010", 29 pgs.
"U.S. Appl. No. 11/618,700, Final Office Action mailed Feb. 28, 2011", 17 pgs.
"U.S. Appl. No. 11/618,700, Final Office Action mailed Dec. 23, 2011", 12 pgs.
"U.S. Appl. No. 11/618,700, Final Office Action mailed Dec. 26, 2008", 18 pgs.
"U.S. Appl. No. 11/618,700, Final Office Action mailed Dec. 28, 2009", 16 pgs.
"U.S. Appl. No. 11/618,700, Non Final Office Action mailed Jun. 23, 2011", 19 pgs.
"U.S. Appl. No. 11/618,700, Non-Final Office Action mailed May 29, 2009", 16 pgs.
"U.S. Appl. No. 11/618,700, Non-Final Office Action mailed Jun. 30, 2008", 12 pgs.
"U.S. Appl. No. 11/618,700, Non-Final Office Action mailed Oct. 4, 2010", 16 pgs.
"U.S. Appl. No. 11/618,700, Pre-Appeal Brief Request for Review filed Mar. 15, 2012", 5 pgs.
"U.S. Appl. No. 11/618,700, Response Filed Feb. 9, 2012 to Final Office Action mailed Dec. 23, 2011", 15 pgs.
"U.S. Appl. No. 11/618,700, Response filed Feb. 26, 2009 to Final Office Action mailed Dec. 26, 2008", 13 pgs.
"U.S. Appl. No. 11/618,700, Response filed Mar. 1, 2003 to Final Office Action mailed Dec. 28, 2009", 15 pgs.
"U.S. Appl. No. 11/618,700, Response filed Mar. 26, 2009 to Advisory Action mailed Mar. 26, 2009 and Final Office Action mailed Dec. 26, 2008", 13 pgs.
"U.S. Appl. No. 11/618,700, Response filed May 12, 2011 to Final Office Action mailed Feb. 28, 2011", 15 pgs.
"U.S. Appl. No. 11/618,700, Response filed Sep. 23, 2011 to Non Final Office Action mailed Jun. 23, 2011", 16 pgs.
"U.S. Appl. No. 11/618,700, Response filed Sep. 29, 2009 to Non Final Office Action mailed May 29, 2009", 15 pgs.
"U.S. Appl. No. 11/618,700, Response filed Sep. 30, 2008 to Non Final Office Action mailed Jun. 30, 2008", 13 pgs.
"U.S. Appl. No. 11/618,700, Response filed Dec. 21, 2010 to Non Final Office Action mailed Oct. 4, 2010", 15 pgs.
"U.S. Appl. No. 11/618,700, Response filed May 26, 2009", 14 pgs.
"U.S. Appl. No. 11/873,704, Non-Final Office Action mailed Mar. 23, 2009", 14 pgs.
"U.S. Appl. No. 11/873,704, Response filed Jun. 18, 2009 to Non Final Office Action mailed Mar. 23, 2009", 23 pgs.
"Chinese Application Serial No. 200580019391.0, Office Action mailed Feb. 1, 2009", 6 pgs.
"Chinese Application Serial No. 200580019391.0, Office Action mailed Aug. 29, 2008", OAR-MISC, 7 pgs.
"Chinese Application Serial No. 200580019391.0, Response filed Jan. 13, 2009 to Office Action mailed Aug. 29, 2008", 16 pgs.
"European Application Serial No. 05746764.9, Examination Report mailed Mar. 18, 2009", 3 pgs.

"European Application Serial No. 05746764.9, Final Written Submission filed Oct. 28, 2011", 8 pgs.
"European Application Serial No. 05746764.9, Summons to Attend Oral Proceedings mailed Oct. 25, 2011", 8 pgs.
"European Application Serial No. 05746764.9, Office Action mailed Apr. 22, 2009", 4 pgs.
"European Application Serial No. 05746764.9, Response filed Dec. 22, 2009 to Office Action mailed Apr. 22, 2009", 13 pgs.
"International Application Serial No. PCT/US2005/010827, International Preliminary Report on Patentability mailed Oct. 26, 2006", 5 pgs.
"International Application Serial No. PCT/US2005/010827, International Search Report mailed Sep. 1, 2006", 2 pgs.
"International Application Serial No. PCT/US2005/010827, Written Opinion mailed Sep. 1, 2006", 3 pgs.
"Taiwanese Application Serial No. 94109697, Notice of Allowance mailed Jun. 2, 2010", 2 pgs.
"Taiwanese Application Serial No. 94109697, Office Action mailed Feb. 9, 2006", 8 pgs.
"Taiwanese Application Serial No. 94109697, Office Action mailed Aug. 14, 2006", 9 pgs.
"Taiwanese Application Serial No. 94109697, Office Action mailed Sep. 14, 2009", 9 pgs.
"Taiwanese Application Serial No. 94109697, Response filed Jan. 22, 2010 to Office Action mailed Sep. 14, 2009", 62 pgs.
"Taiwanese Application Serial No. 94109697, Response filed Apr. 14, 2006 to Office Action mailed Feb. 9. 2006", 108 pgs.
"U.S. Appl. No. 10/941,510 , Response filed Jun. 17, 2013 to Non Final Office Action mailed Feb. 15, 2013", 10 pgs.
"U.S. Appl. No. 10/941,510, Decision on Pre-Appeal Brief mailed Nov. 15, 2012", 2 pgs.
"U.S. Appl. No. 10/941,510, Examiner Interview Summary mailed Jun. 21, 2013", 3 pgs.
"U.S. Appl. No. 10/941,510, Non Final Office Action mailed Feb. 15, 2013", 13 pgs.
"U.S. Appl. No. 10/941,510, Notice of Allowance mailed Oct. 9, 2013", 12 pgs.
"U.S. Appl. No. 10/941,510, Notice of Allowance mailed Oct. 23, 2013", 11 pgs.
"U.S. Appl. No. 10/941,510, Notice of Non-Compliant Amendment mailed Jun. 24, 2013", 3 pgs.
"U.S. Appl. No. 10/941,510, Pre-Appeal Brief Request mailed Oct. 12, 2012", 5 pgs.
"U.S. Appl. No. 10/941,510, Response filed Jun. 28, 2013 to Notice of Non-Compliant Amendment mailed Jun. 24, 2013", 10 pgs.
"U.S. Appl. No. 11/618,700, Examiner Interview Summary mailed Aug. 30, 2012", 2 pgs.
"U.S. Appl. No. 11/618,700, Non Final Office Action mailed Apr. 16, 2013", 12 pgs.
"U.S. Appl. No. 11/618,700, Non Final Office Action mailed Nov. 13, 2012", 12 pgs.
"U.S. Appl. No. 11/618,700, Notice of Allowance mailed Nov. 14, 2013", 8 pgs.
"U.S. Appl. No. 11/618,700, Response filed Feb. 11, 2013 to Non Final Office Action mailed Nov. 13, 2012", 13 pgs.
"U.S. Appl. No. 11/618,700, Response filed Jul. 16, 2013 to Non Final Office Action mailed Apr. 16, 2013", 14 pgs.
"European Application Serial No. 05746764.9, Office Action mailed Mar. 23, 2012", 32 pgs.
"U.S. Appl. No. 14/189,113, Non Final Office Action mailed Sep. 11, 2014", 11 pgs.
"U.S. Appl. No. 14/189,113, Preliminary Amendment filed Mar. 10, 2014", 7 pgs.
"U.S. Appl. No. 14/207,401, Non Final Office Action mailed May 7, 2014", 7 pgs.
"U.S. Appl. No. 14/207,401, Non Final Office Action mailed Jul. 18, 2014", 9 pgs.

* cited by examiner

HTTP://WWW.PAYMENT-PROVIDER.COM

ONLINE PAYMENT SERVICE PROVIDER

MERCHANT-INITIATED PAYMENTS – PAYMENT RELATIONSHIP CUSTOMIZATION
(Enter Maximum Monthly $ Amount)

| $250.00 | MERCHANT 1 – PAYMENT RELATIONSHIP |
| N/A | MERCHANT 2 – PAYMENT RELATIONSHIP |
| $100.00 | MERCHANT 3 – PAYMENT RELATIONSHIP |
| $75.00 | MERCHANT 4 – PAYMENT RELATIONSHIP |

METHOD AND SYSTEM FOR FACILITATING ONLINE PAYMENTS BASED ON AN ESTABLISHED PAYMENT AGREEMENT

RELATED APPLICATIONS

This application is a continuation of U.S. application Ser. No. 10/873,704 filed Jun. 21, 2004 now U.S. Pat. No. 8,175, 938, and claims the benefit of the filing date of U.S. Provisional Patent Application No. 60/562,065, filed Apr. 13, 2004, which applications are incorporated in their entirety herein by reference.

FIELD OF THE INVENTION

The present invention relates generally to commerce automation. More particularly, the present invention relates to a method and system for facilitating online payments based on an established payment agreement.

BACKGROUND OF THE INVENTION

Electronic commerce ("e-commerce") has been increasing in popularity as more people are becoming accustomed to purchasing products online via the Internet. Such purchases can be facilitated through the use of a third-party, online payment service, such as the PayPal® online payment service, provided by PayPal® of San Jose, Calif. One problem with existing online payment services is that the customer must navigate away from the merchant's website to make a payment. For example, the customer must login to the payment service provider's website for each online payment the customer makes. The extra time spent logging into and navigating the payment service provider's website to make a payment is inconvenient, particularly when the purchase involves a small amount of money.

BRIEF DESCRIPTION OF THE DRAWINGS

The present invention is illustrated by way of example, and not by way of limitation, in the figures of the accompanying drawings, in which like references indicate similar elements, and in which.

DETAILED DESCRIPTION

A method and system for facilitating merchant-initiated online payments are described. In the following description, for purposes of explanation, numerous specific details are set forth in order to provide a thorough understanding of the present invention. It will be evident, however, to one skilled in the art that the present invention may be practiced without these specific details.

The present invention provides several advantages over prior payment methods and systems. In particular, the present invention provides a customer with a simpler and faster way to transact with merchants. According to one embodiment of the present invention, a customer initiates a merchant-initiated payment relationship with a merchant by navigating a series of web pages and providing the necessary information to establish the payment relationship. Once the payment relationship is in place, the customer can purchase goods and/or services from the merchant with the ease and simplicity of a single click to authorize a payment. Other features and advantages of the present invention will be apparent from the detailed description that follows.

Figure 1:
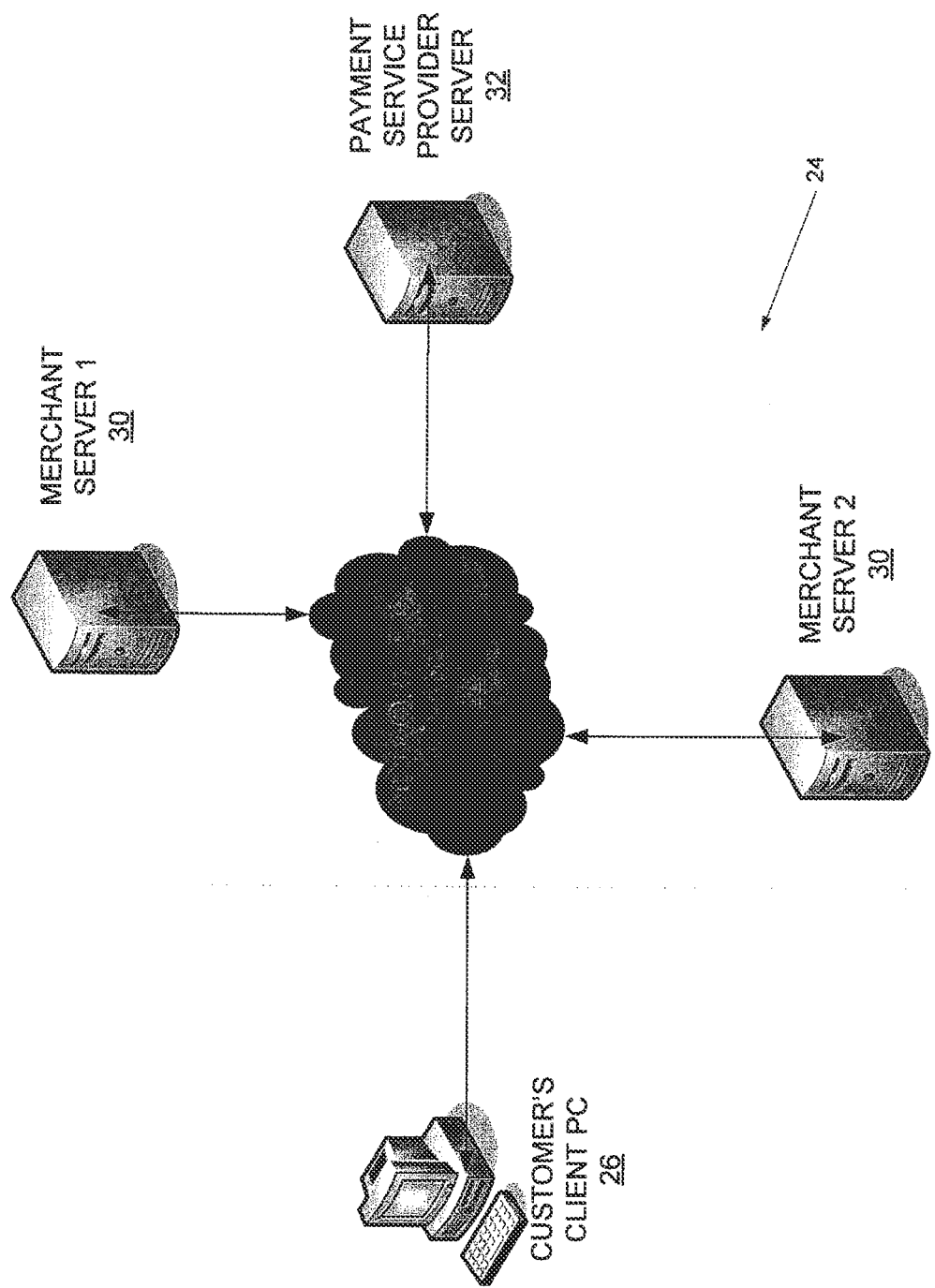
FIG. 1 is an exemplary client-server network diagram illustrating the relationship between a client PC, a merchant server and a payment service provider server, for one embodiment of the present invention.

FIG. 1 illustrates an example of a client-server network environment 24 in which the present invention might be implemented. In accordance with one embodiment of the present invention, and as illustrated in FIG. 1, a potential customer, or buyer, uses a client personal computer (PC) 26 connected to a network (e.g., the Internet 28) to interact with a merchant server 30 and a payment service provider's server 32. The client PC 26 will generally execute client software such as a web client (e.g., a browser, such as the Internet Explorer browser developed by Microsoft Corporation of Redmond, Washington State) that enables the customer to browse web pages on the World Wide Web. In FIG. 1, the client 26 is illustrated as a PC. However, it will be appreciated that the client 26 could be any type of computing device including, but not limited to, a laptop, a handheld digital assistant, a mobile phone, or a point-of-sale terminal.

The merchant server 30 executes Internet server software including, but not limited to, web server software and Application Program Interface (API) server software. The web server software executing on merchant server 30 serves web pages to web clients, such as a web browser executing on client 26. The web pages provide an interface to a virtual store that customers can browse with the web browser software. While browsing the virtual store, customers can select items to purchase. The merchant server 30 temporarily stores items selected for purchase, which can be accessed for checkout by selecting a link to a virtual shopping cart.

Figure 2:
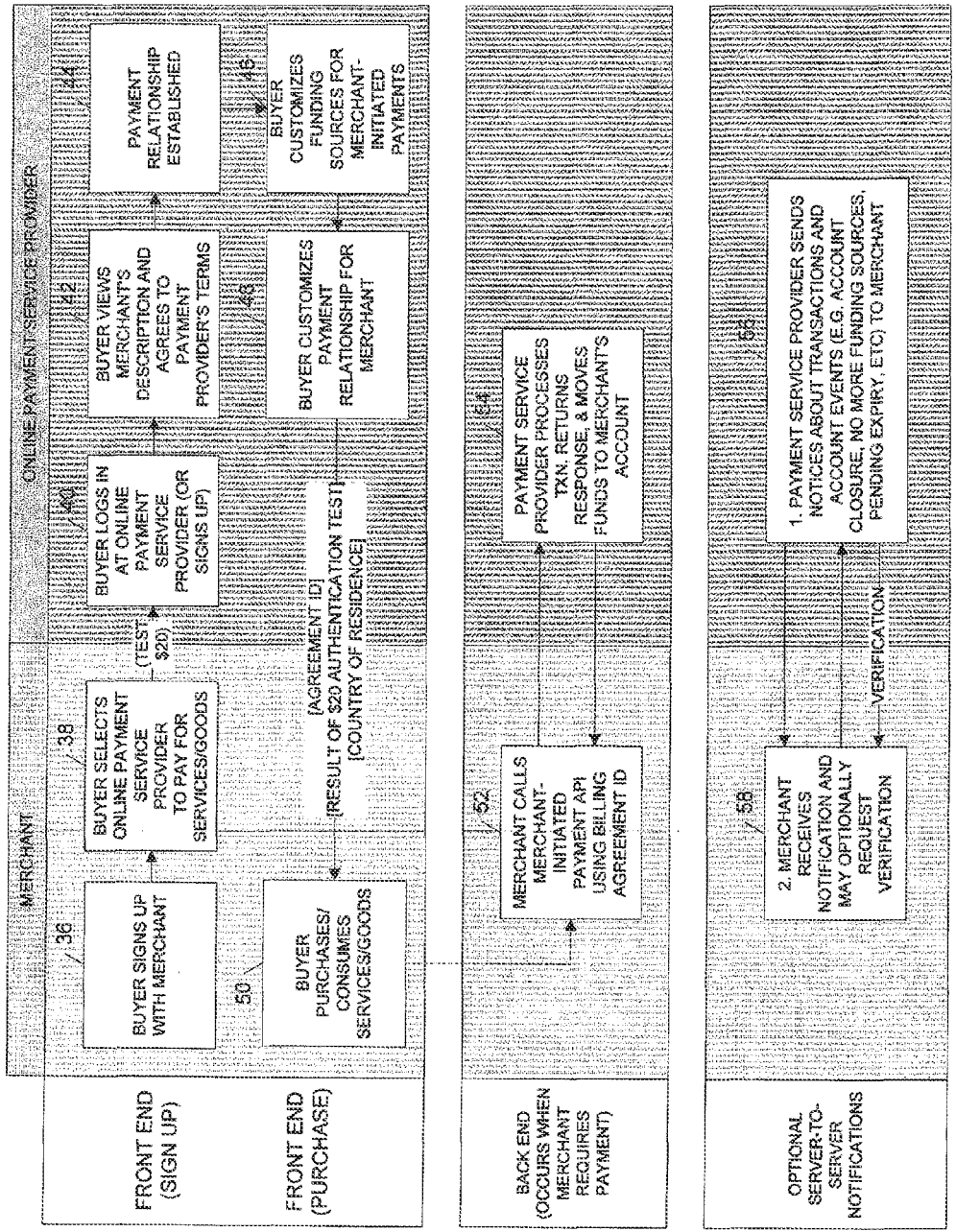
FIG. 2 illustrates a web-based flow, for one embodiment of the invention, of a method of initiating a payment relationship with a merchant for merchant-initiated "pull" payments.

The payment service provider's server 32 is connected to the client PC 26 and the merchant server 30 via the Internet 28. Like the merchant server 30, the payment service provider's server 32 also executes Internet server software including, but not limited to, web server software and API server software. For one embodiment of the present invention, to process a payment for the customer's selected items, the merchant server 30 interacts with the payment service provider's server 32 via an API protocol. For example, the API server software provides a programmatic interface allowing the merchant server 30 and the payment service provider's server 32 to communicate using standardized API calls. According to one embodiment of the present invention, a software development kit may be provided to each merchant that offers its customers the option to pay via the payment service provider. Consequently, before a customer enters into a payment relationship with a merchant, the merchant will generally already have established a relationship of its own with the payment service provider, and the merchant will have integrated the API functionality into its merchant server 30 to communicate with the payment service provider's server 32. Entering into a Merchant-Initiated Payment Relationship FIG. 2 illustrates a web-based, sign-up flow for a payment relationship, for one embodiment of the present invention. Each of the actions, or operations, illustrated in FIG. 2 is presented in association with a different web page that is presented to the customer. However, it will be appreciated that each of the actions is only an example, and that multiple actions or operations could be combined or separated to occur in connection with one or more web pages presented to the customer.

For purposes of the invention, a merchant is any person or entity that is set up to receive payments in exchange for goods or services. For example, a merchant may include any seller, vendor, retailer, or person initiating an auction for goods or services. Once a customer has established an account, or signed up, with the merchant 36 and has selected goods and/or services to purchase, the customer may be presented with several payment options. For example, if the customer has a pre-existing merchant-initiated payment relationship with the merchant, the customer may be presented with the option to make a payment via the payment service provider using a merchant-initiated payment, the details of which will be described in detail below. However, if the customer does not yet have an existing merchant-initiated payment relationship with the merchant, the customer will be presented with an option to establish a merchant-initiated payment relationship with the merchant by selecting a "sign-up" button or link, directing the customer to the website of the payment service provider.

For one embodiment of the present invention, the communication between the merchant server 30 and the payment service provider server 32 is via API calls with standardized variables. For example, when the customer selects to establish a merchant-initiated payment relationship with the merchant 38 by clicking a "sign-up" link on the merchant's website, an API call is made from the merchant server 30 to the payment service provider server 32, requesting the establishment of a merchant-initiated payment relationship. In connection with the request, one or more data items may be communicated to the payment service provider server 32. The data items may include, but are not limited to the following:

| DATA ITEM NAME | DATA ITEM DESCRIPTION |
| --- | --- |
| BILLING_AGREEMENT_ID | A unique identification number for the payment relationship or billing agreement. |
| MERCHANT_NAME | The name of the business and/or an email address for the business. |
| SERVICE_DESCRIPTION | A brief description of the goods or service within the scope of the merchant-initiated payment relationship. |
| PAYMENT_TYPE | The type of payment required by the merchant. |
| TEST_AMOUNT | A currency amount to be tested against the customer's account. |
| CURRENCY_CODE | The default currency accepted by the business. |
| MAXIMUM | A default maximum currency amount authorized by the customer to be charged against his virtual wallet per month. |
| MAXIMUM_EDIT | A binary value that indicates whether the maximum amount is customizable by the customer. |
| MINIMUM | A minimum amount that the customer will be charged per month. |
| IPN_URL | A server-to-server communication providing instant payment notifications. |

For one embodiment of the invention, the merchant server 30 may encrypt the data items before communicating the data items to the payment service provider's server 32. Additionally, for security reasons, the merchant server 30 may digitally sign the message associated with the API call so that the payment service provider's server 32 can verify the authenticity of the message when it is received.

After the customer has selected to establish a merchant-initiated payment relationship 38 with the merchant, the customer is redirected to a payment relationship initiation web page 40 hosted by the payment service provider's server 32. If, for example, the customer has a pre-existing account with the payment service provider, the customer may be asked to verify his identity by submitting the user credentials (e.g., username and/or password) associated with the customer's existing account. However, if the customer does not have a pre-existing account with the payment service provider, the customer may be asked to provide a username and password, as well as other information, to establish an account and to identify the customer as the holder of the account with the payment service provider.

In either case, the customer is presented with information about the merchant and the terms of the merchant-initiated payment relationship agreement with the payment service provider. For example, the terms of the agreement may be directly related to the data items communicated from the merchant server 30 to the payment service provider server 32. The terms may include the name of the payee to which payments will be made on behalf of the customer and the exact nature of the goods and/or service for which the customer authorizes the payment service provider to make payments. In addition, the agreement terms may include a default maximum or minimum amount that the customer authorizes to be paid to the merchant over a particular time period. For example, the agreement underlying the payment relationship may dictate that the payment service provider, on behalf of the customer, is authorized to pay merchant-initiated payment requests for a particular dollar amount per month. If the customer agrees with the terms of the agreement, the customer may indicate so, by clicking on a particular link, or button. In response, the customer may be presented with a web page confirming the establishment of the merchant-initiated payment relationship 44.

As will be discussed in greater detail below, the customer may be presented with the option to add, delete or customize funding sources 46 for the merchant-initiated payment relationship. For example, the customer may be given the option to add a new account (e.g., bank account or credit card account) to the customer's virtual wallet. In addition, the customer may be presented with the option to customize the terms of the payment relationship.

Authentication or Verification of Customer'S Online Wallet Account

For one embodiment of the present invention, the merchant may process a test transaction against a customer's account (e.g., the customer's online wallet) during the establishment of the merchant-initiated payment relationship, or alternatively, at later time, for example, when the customer requests a payment. For example, for one embodiment of the invention, the merchant server 30 may communicate a test amount variable to the payment service provider server 32 along with a request to establish a merchant-initiated payment relationship. The payment service provider server 32 receives the test amount variable, and processes a verification payment using the payment service model. As a verification payment, the payment is processed for test purposes only, and not actually charged to the customer's account.

For one embodiment of the invention, the payment service provider server 32 communicates a response to the merchant server 30 indicating whether or not the test amount was successfully processed. For example, the response may be binary in nature, indicating a simple "yes" or "no." For one embodiment of the invention, if the test amount failed for some reason, an explanation for the failure is communicated to the merchant server 30 along with the response. For example, if the test fails because the customer's account has been restricted, or if the test amount exceeds the customer's available funds, or for any other reason, an explanation indicating the reason for the failure may be included in the response to the merchant server 30.

One advantage of the account verification procedure is that it allows a merchant to receive a simple binary response, for example, success or failure. This reduces the complexity of the logic required by other more complicated fraud scoring models. Additionally, in contrast to sonic credit card account verification procedures, a successful verification of the test amount is not synonymous with a guarantee of payment. The verification procedure is time sensitive in the sense that success or failure depends on the status of the customer's account at the time the test is run.

API for Making Merchant-Initiated Payment Requests

After a customer has established a merchant-initiated payment relationship with a particular merchant, the customer can transact with the merchant with the simple click of a button or link. For example, once a customer has selected one or more goods and/or services to purchase from a merchant's online store, the customer may select a link to pay via the payment service provider, using the established merchant-initiated payment relationship.

When the customer selects the link to use the merchant-initiated payment method, the merchant server 30 makes an API call to the payment service provider server 32 requesting a payment 52. For one embodiment of the invention, the request may include a number of data items related to the transaction. For example, for one embodiment of the invention, the data items may include, but not be limited to:

| DATA ITEM NAME | DATA ITEM DESCRIPTION |
| --- | --- |
| BILLING_AGREEMENT_ID | A unique identification number for the payment relationship or billing agreement. |
| AMOUNT | The currency amount of the payment requested. |
| PAYMENT_TYPE | The type of payment required by the merchant. |
| TEST_AMOUNT | A currency amount to be tested against the customer's account. |
| CURRENCY_CODE | The default currency accepted by the business. |
| TAX | The currency amount of tax to be charged. |
| SHIPPING | The currency amount to be charged for shipping. |
| HANDLING | The currency amount to be charged for handling. |
| ITEM_DESCRIPTION | A description or identification number of the item purchased. |
| ITEM_NUMBER | The number of items purchased. |

For one embodiment of the invention, the merchant server 30 may encrypt the data items related to the transaction before communicating the data items to the payment service provider's server 32. Additionally, for security reasons, the merchant server 30 may digitally sign the message associated with the API call so that the payment service provider's server 32 can verify the authenticity of the message when it is received.

In response to the payment request, the payment service provider server 32 validates and processes the request. For one embodiment of the invention, the payment service provider server 32 performs several validation routines when it receives a payment request. For example, the payment service provider server 32 may validate the variables passed in by the merchant server 30 to ensure that all the required data has been received and is in the proper format. In addition, the payment service provider server 32 may ensure that the payment request is within the scope of the merchant-initiated payment relationship. For example, the payment service provider server 32 may ensure that the amount billed does not exceed a maximum amount that the customer has authorized for merchant-initiated payments under a merchant-initiated payment relationship with that particular merchant.

After validating the request, the payment service provider server 32 processes the request. For one embodiment of the invention, the payment service provider server 32 performs several routines when processing the request. For example, the payment service provider server 32 may analyze or calculate a shipping profile and/or tax profile for the transaction. Additionally, the payment service provider server 32 may perform a funding source analysis to select the proper funding source for the transaction. For example, the customer may have selected a preferred funding source for the particular merchant-initiated payment relationship. If so, the payment service provider server 32 may attempt to process the transaction using the preferred funding source before falling back to a default funding source.

For one embodiment of the invention, the payment service provider server 32 always attempts to process the transaction with funds held in an account with the payment service provider (e.g., an internally held account), and only uses a customer-selected preferred or secondary account (e.g., an externally linked account, such as a bank or credit card account) if there are insufficient funds in the internally held account. For one embodiment of the invention, the payment service provider server 32 will continue attempting to process the payment if the transaction is unsuccessful using one or more accounts. For example, the payment service provider server 32 will proceed to use accounts, in a default order, or an order specified by the customer, to attempt processing the transaction until it has been unsuccessful with every account in the customer's virtual wallet. At that time, the payment service provider server 32 will communicate a failure message to the merchant server 30 via an API call. The API call may specify the reason for the failure.

In an alternative embodiment, the payment service provider server will report a failure to the merchant server 30 after a first attempt to process the transaction has failed. The message to the merchant server 30 may indicate a reason for the failure, and the merchant server 30 may request a second attempt using a different account, or combination of accounts in the virtual wallet.

In any case, the response communicated to the merchant server 30 is synchronous in nature. In addition to a synchronous response, the payment service provider server 32 may communicate an asynchronous response. For example, an instant payment notification (IPN) may be communicated to the merchant server 30 at a later time if, for example, the synchronous response was not communicated due to a network problem, or, if there was a delay in processing the payment using a particular account.

Another advantage of the API is the ease with which it can be implemented by a third party. For example, for one embodiment of the invention, a third-party may implement the API to provide payment processing on behalf of the merchant. The API allows the third party to seamlessly integrate payment processing for the merchant with limited work and adaptation from the merchant.

Selection of the Funding Source for Payments

One of the advantages of the present invention is that the customer is provided with significant flexibility in customizing funding sources for payments on a per merchant basis. For example, for each merchant-initiated payment relationship the customer enters into, the customer has the ability to customize the funding source to be used for paying that particular merchant. This flexibility allows the customer to 1) select different funding sources for different merchants, 2) select preferred funding sources for particular merchants, and/or 3) disable funding sources for particular merchants.

Figure 3:
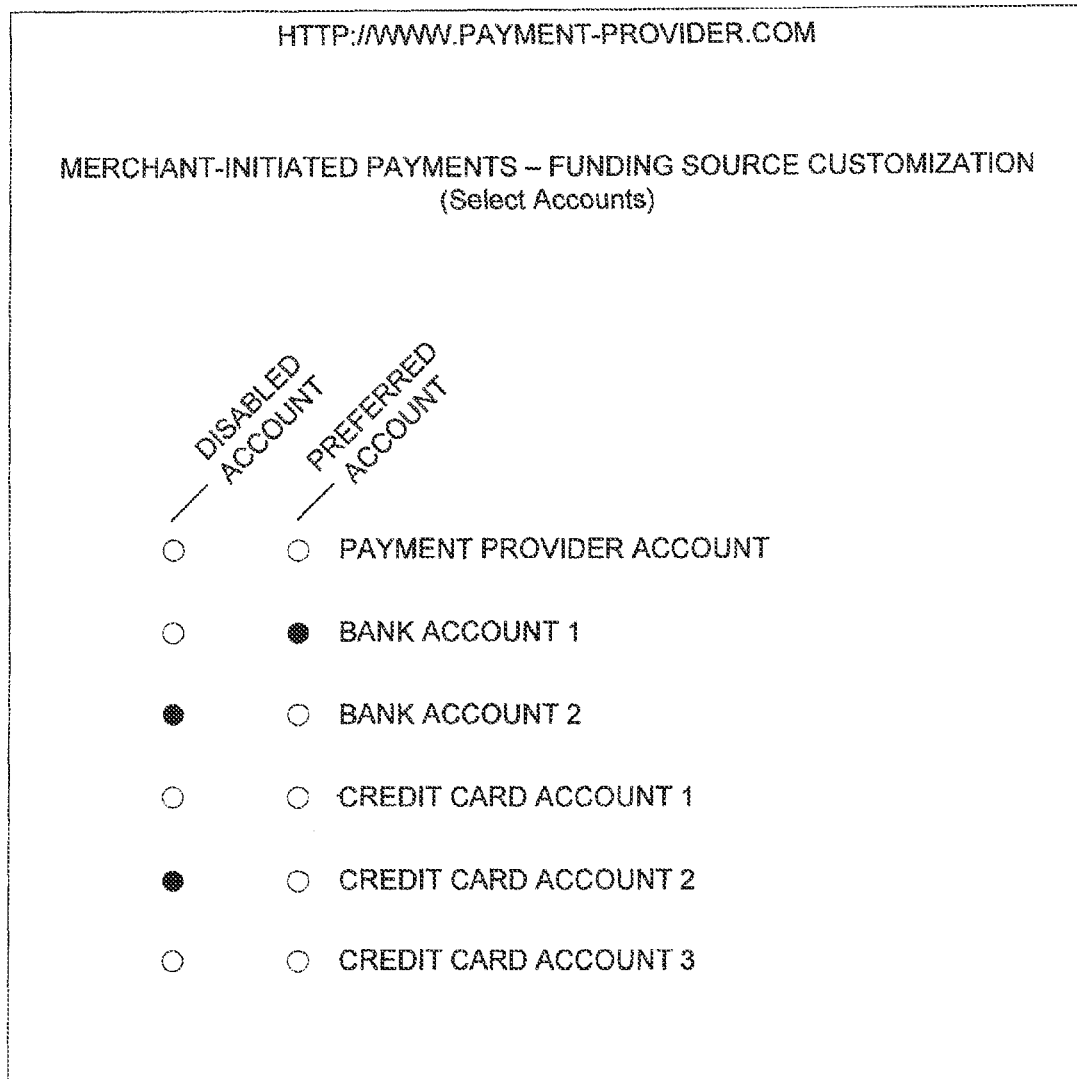
FIG. 3 illustrates an example of a web page for customizing the funding sources of a merchant-initiated payment relationship.

For one embodiment of the invention, the customer may be presented with a funding source customization web page, such as the example web page illustrated in FIG. 3. The funding source customization web page 62 may be presented to the customer at the time the merchant-initiated payment relationship is established, as illustrated by the web-based action with reference number 46 in FIG. 2. Alternatively, the funding source customization web page 62 may be accessed via the payment service provider's home website at a later time as part of a profile setting for the customer.

The funding source customization web page 62 allows the customer to select a preferred funding source (e.g., bank, credit card, or other account) from which payments should be processed for transactions with the merchant that are associated with the merchant-initiated payment relationship. In addition, the customer may disable certain funding sources for a particular merchant-initiated payment relationship. For one embodiment of the invention, the customer is given the option of ranking or ordering all the accounts in the customer's virtual wallet. Furthermore, for one embodiment, the payment service provider server 32 may select a certain account as the default account and always attempt to use this default account first.

Customer'S Customization of the Merchant Agreement

One advantage of the present invention is the control that the customer is provided in relation to customizing the payment relationship. For example, not only can the customer control the funding sources on a per merchant basis, as described above, but the customer is also given the ability to set maximum payment amounts on a per merchant basis. For example, the customer may set a maximum payment amount that a particular merchant can charge under a merchant-initiated payment relationship.

Figure 4:
FIG. 4 illustrates an example of a web page for customizing a merchant-initiated payment relationship.

For one embodiment of the invention, the customer may be presented with a payment relationship customization web page 64, such as the example web page illustrated in FIG. 4. The payment relationship customization web page 64 may be presented to the customer at the time the merchant-initiated payment relationship is established, as illustrated by the web-based action with reference number 48 in FIG. 2. Alternatively, the payment relationship customization web page 64 may be accessed via the payment service provider's home website at a later time as part of a profile setting for the customer.

For one embodiment of the present invention, the customer is able to set maximum payment amounts on a monthly basis per merchant-initiated relationship, as illustrated in FIG. 4. For example, for one embodiment of the invention, the customer is able to set a maximum dollar amount that the payment service provider is authorized to pay a particular merchant in a given month, on behalf of the customer. Alternatively, the maximum amount could be for a given time period other than a month, for example, a maximum per week, quarter, or year. In addition, for one embodiment of the invention, the customer is able to set a maximum payment amount for a single transaction and/or a maximum number of transactions for a given time period. For example, for a specific merchant-initiated payment relationship, the customer might select to set the maximum number of transactions in a given month to five, the maximum payment amount for any single transaction to $50, and the maximum payment amount for a single month to $200. Consequently, the customer is given great flexibility For one embodiment of the invention, each merchant determines whether the customer should have control over setting any maximum amounts. For example, as illustrated in FIG. 4, merchant 2 does not allow a maximum amount to be controlled by the customer.

Merchant Notifications

Another advantage of the present invention is the merchant notifications that are communicated asynchronously from the payment service provider's server to each merchant server 30. For example, as illustrated in FIG. 2, the payment service provider server 32 may on occasion communicate messages 56 to a merchant server 30 with updates on the status of a particular merchant-initiated payment relationship. Additionally, the merchant server 30 may request verification 58 of a particular notification message that the merchant server 30 receives. For example, if a customer closes his account with the payment service provider, the payment service provider server 32 may notify the merchant server 30. Consequently, the merchant server 32 will be able to discontinue presenting the payment service provider as a payment option at the merchant's checkout web page for the customer. In addition, notifications may be sent to the merchant server if, for example, a linked account (e.g., a credit card account) in the customer's virtual wallet expires or is otherwise cancelled.

Figure 5:
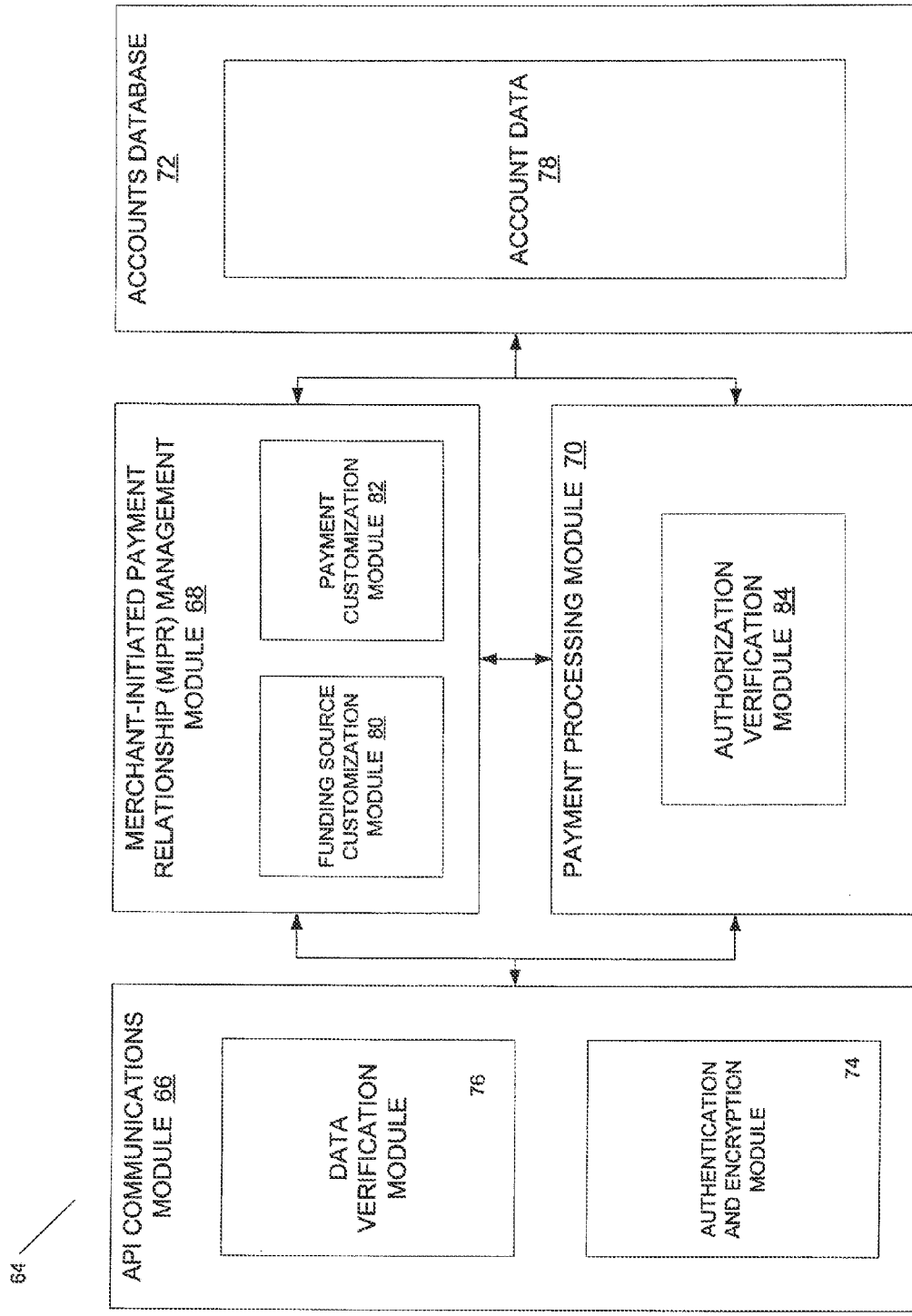
FIG. 5 illustrates a system to facilitate merchant-initiated electronic payments.

FIG. 5 illustrates a system 64, consistent with one embodiment of the invention, to facilitate merchant-initiated electronic payments. The system includes an Application Programming Interface (API) communications module 66, a merchant-initiated payment relationship management module 68, a payment processing module 70, and an accounts database 72. For one embodiment of the invention, the system receives requests to establish merchant-initiated payment relationships, or agreements, as well as requests for payment under previously established relationships, or agreements.

Using one of a variety of standardized protocols, the API communications module 66 receives API messages from a merchant server. The API messages may include any number of pre-defined data items, such as those in the charts shown above with respect to the description of FIG. 2. For one embodiment of the invention, after receiving an API message, the API communications module authenticates, decrypts and verifies the message.

For example, for one embodiment of the invention the API communications module includes an authentication and encryption module 74 that may authenticate and decrypt the message. For example, the authentication and encryption module 74 may check a digital signature included with the message to determine whether the message is from a trusted source, such as a merchant server with a proper digital signature key. Next, the authentication and encryption module 74 may decrypt the message, if the merchant server that sent the message originally encrypted it.

Next, a data verification module 76 may verify the data items included in the message. For example, if the message is a request to establish a merchant-initiated payment relationship, then the data verification module 76 may verify that the request includes all of the data items required for such a request. Furthermore, the data verification module 76 may verify that the data items received with the request are of the proper type and format. For example, the data verification module 76 may check a data item to determine whether it is a number or character, and whether it has the proper length. If a data field is invalid for any reason, the API communications module 66 may reject the message and/or send a reply message notifying the sender of the original message that one or more data items were invalid.

For one embodiment of the present invention, the merchant-initiated payment relationship management module 68 manages the formation and administration of merchant-initiated payment relationships and accounts to which each relationship is linked. For example, the management module 68 processes requests to establish new merchant-initiated payment relationships, and links each established relationship to the account of a payment service provider account holder. For example, as illustrated in FIG. 5, an account holder may establish several merchant-initiated payment relationships with a wide variety of merchants. The management module 68 establishes each merchant-initiated payment relationship and links the data associated with each relationship to the account data 78 associated with the user's account held in an accounts database 72.

In addition, for one embodiment of the invention, the management module 68 includes a funding source customization module 80 and a payment customization module 82. The funding source customization module 80 allows a user to customize a funding source for a particular merchant-initiated payment relationship. For example, for one embodiment of the invention, the funding source customization module 80 facilitates the adding and deleting of funding sources for a user account or merchant-initiated payment relationship. Furthermore, the funding source customization module 80 may facilitate the presentation of funding sources to a user, and the reception of funding source selections from the user, including a preferred funding source (e.g., a particular bank account or credit card account) selected by a user. Consequently, when a payment request is received under a particular merchant-initiated payment relationship and processed, the payment processing module 70 will attempt to use funding sources in the order specified by the user.

For one embodiment of the invention, the management module also includes a payment customization module 72. The payment customization module facilitates the customization of terms of the merchant-initiated payment relationships. For example, the payment customization module 82 provides the logic to present users with the option of setting maximum payment amounts. For one embodiment of the invention, the payment customization module customizes the payment relationship on a per merchant basis, by providing the user with the ability to set a maximum payment amount per transaction, or a maximum payment amount for a predetermined period of time (e.g., maximum total payments per a given month). Additionally, the payment customization module may provide the user with the ability to limit the total number of payment requests that are processed for a particular merchant in a given time period. For example, the user may be able to limit a merchant to making one payment request per month.

Prior to processing a payment in connection with a payment request, the payment processing module 70 may perform a verification process to verify that the user has properly authorized a payment in connection with the particular terms of a payment request. For example, the authorization verification module 84 of the payment processing module 70 may verify that the payment processor has been property authorized by the user to make a payment in connection with the payment request. In addition to checking or verifying payment limits set by the user using the payment customization module 82, the authorization verification module 84 may verify that the particular product or service associated with the payment request received from the merchant is a product or service that has been authorized for merchant-initiated payments under the merchant-initiated payment relationship.

Figure 6:
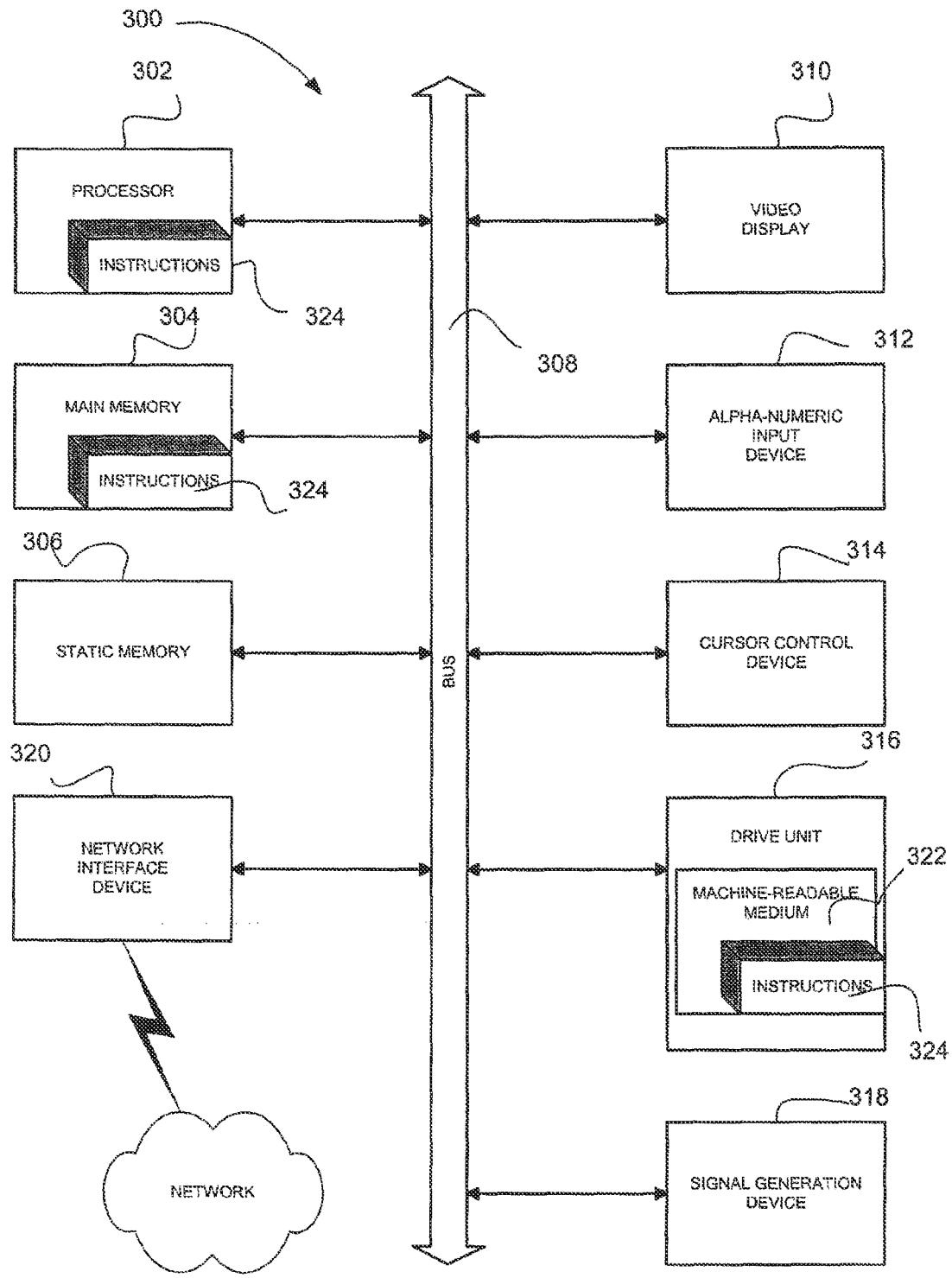
FIG. 6 shows a diagrammatic representation of a machine in the exemplary form of a computer system within which a set of instructions, for causing the machine to perform any one or more of the methodologies discussed herein, may be executed.

FIG. 6 shows a diagrammatic representation of a machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer, or distributed, network environment. The machine may be a server computer, a client computer, a PC, a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media. The software 324 may further be transmitted or received over a network 326 via the network interface device 320.

While the machine-readable medium 392 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium"

shall accordingly be taken to include, but not be limited to, solid-state memories, optical and magnetic media, and carrier wave signals.

Thus, the present invention provides a method and system for facilitating merchant-initiated online payments. Accordingly, a merchant is provided with the means to "pull" funds from a customer's account with a payment service provider on an as-needed basis, as opposed to a regular schedule as with a subscription-type service. Before the merchant is allowed to "pull" funds from the customer's account, the customer will first indicate that the customer would like to establish the merchant-initiated payment relationship with the merchant, via a series of web pages hosted by the payment service provider. The ability to customize the payment relationship agreement on a per merchant basis provides the customer with a certain level of security and protection. For example, the customer is allowed to set preferred funding sources and set maximum payment amounts (e.g., maximum dollars per month, or per transaction) on a per merchant basis. This customization is advantageous to the customer because it protects the customer from potential funds overdrafts and credit limit overruns. Additionally, the customization feature is beneficial to the merchants because it limits the likelihood of disputes and chargebacks.

Thus, a method and system are provided with reference to specific exemplary embodiments. It will be evident that various modifications and changes may be made to theses embodiments without departing from the broader spirit and scope of the invention. Accordingly, the specification and drawings are to be regarded in an illustrative rather than a restrictive sense.

What is claimed is:

1. A method comprising:
    receiving, at a payment service provider server via a programmatic interface from a merchant server specially configured to communicate using API calls with the specially configured payment service provider server, an API call that includes a relationship request to establish, at the payment service provider server, a payment agreement between a merchant and a user prior to any transactions between the merchant and the user, the API call triggered in response to a selection by the user of a link to establish the payment agreement on an interface presented to a device of the user;
    verifying, by the payment service provider server, that the relationship request includes properly formatted data items that are used in establishing the payment agreement between the merchant and the user;
    based on the verifying and using at least one processor of the payment service provider server, establishing the payment agreement between the merchant and the user at a payment service provider that defines terms of a payment relationship between the merchant and the user prior to any transactions between the merchant and the user, the payment agreement being established in response to receiving, from the user, the relationship request to establish the payment agreement with the merchant, the establishing of the payment agreement including linking the payment agreement with a payment account of the merchant or user maintained at the payment service provider, the payment service provider being a separate entity from the merchant;
    after establishing the payment agreement, receiving, at the payment service provider server, a payment request associated with a transaction from the merchant, the payment request including a unique identifier to identify the payment agreement established between the merchant and the user and stored in data storage at the payment service provider server prior to any transactions between the merchant and the user;
    verifying, by the payment service provider server, that the payment request complies with the terms of the payment relationship between the merchant and the user established prior to any transactions between the merchant and the user, the verifying including accessing the terms of the payment relationship stored in the data storage at the payment service provider server; and
    based on the verifying that the payment request complies with the terms of the payment relationship between the merchant and the user established prior to any transactions between the merchant and the user, automatically and without user intervention, processing the payment request by the payment service provider server,
    the receiving of the payment request, verifying that the payment request complies with the terms, and automatically processing being triggered in response to a single action performed at the device of the user.

2. The method of claim 1, wherein the relationship request includes at least one term defining an authority given to the payment service provider to make payments to the merchant on behalf of the user.

3. The method of claim 1, wherein the properly formatted data items include an identification of a particular product or service for which the payment service provider is authorized to make payments under the established payment agreement.

4. The method of claim 1, further comprising receiving the payment request from the merchant that requests payment under one or more terms of the established payment agreement.

5. The method of claim 4, wherein the payment request is generated by a merchant server in response to the user selecting the established payment agreement as a payment type for processing the transaction with the merchant via a website hosted by the merchant.

6. The method of claim 1, further comprising:
    during or after the establishing of the payment agreement, presenting the user with an option to customize at least one term of the payment agreement; and
    receiving user input indicating a customization of the at least one term.

7. The method of claim 6, wherein the presenting the user with the option to customize the at least one term includes presenting the user with an option to customize an authority given to the payment service provider to make payments to the merchant on behalf of the user.

8. The method of claim 6, wherein the presenting the user with the option to customize the at least one term includes presenting the user with an option to modify a funding source for the payment agreement.

9. The method of claim 1, further comprising presenting the user an option to select, from a list of funding sources available to the user, one or more funding sources.

10. The method of claim 1, further comprising allowing the user to set a maximum payment amount, for a particular time period, that the payment service provider is authorized to pay the merchant on behalf of the user.

11. The method of claim 1, further comprising allowing the user to set a maximum payment amount, for a single transaction, that the payment service provider is authorized to pay the merchant on behalf of the user.

12. The method of claim 1, further comprising allowing the user to set a maximum number of payment requests, for a particular time period, for which the payment service provider is authorized to make payments to the merchant on behalf of the user.

13. A method comprising:

receiving, at a payment service provider server, a payment request from a merchant, the payment request including a unique identifier to identify a previously established payment agreement between a merchant and a user established with a payment service provider prior to any transactions between the merchant and the user, the previously established payment agreement defining terms including an authority granted by the user to the payment service provider to make payments to the merchant on behalf of the user, the previously established payment agreement established in response to receiving, at the payment service provider server via a programmatic interface from a merchant server specially configured to communicate using API calls with the specially configured payment service provider server, an API call, via a selection by the user of a link to establish the payment agreement on an interface presented to a device of the user, that includes a request to establish the payment agreement between the merchant and the user prior to any transactions between the merchant and the user, the request being verified by the payment service provider server to determine whether the request includes properly formatted data items that are used in establishing the payment agreement between the merchant and the user;

using one or more processors of the payment service provider server, accessing a database to retrieve the terms of the previously established payment agreement between the merchant and the user stored at the payment service provider, based on the unique identifier;

verifying, by the payment service provider server, that processing the payment does not violate the terms of the previously established payment agreement; and based on the verifying that processing the payment request does not violate the terms of the previously established payment agreement, automatically and without user intervention, processing the payment request by the payment service provider server, the receiving of the payment request, verifying that the payment request does not violate the terms, and automatically processing being triggered in response to a single action performed at a device of the user.

14. The method of claim 13, wherein the verifying further comprises verifying that processing the payment request does not exceed the authority granted under the previously established payment agreement by verifying that processing the payment request will not exceed a maximum payment amount set by the user.

15. The method of claim 13, wherein the verifying further comprises verifying that processing the payment request does not exceed the authority granted under the previously established payment agreement by verifying that processing the payment request will not exceed a maximum number of payment requests processed over a predetermined time period.

16. The method of claim 13, wherein the verifying further comprises verifying that processing the payment request does not exceed the authority granted under the previously established payment agreement by verifying that the payment request is in connection with a product or service for which the payment service provider is authorized to make a payment.

17. A machine-readable storage medium having no transitory signals and storing instructions which, when executed by at least one processor of a machine, causes the machine to perform operations comprising:

receiving, at payment service provider server via a programmatic interface from a merchant server specially configured to communicate using API calls with the specially configured payment service provider server, an API call that includes a relationship request to establish, at the payment service provider server, a payment agreement between a merchant and a user prior to any transactions between the merchant and the user, the API call triggered in response to a selection by the user of a link to establish the payment agreement on an interface presented to a device of the user;

verifying, by the payment service provider server, that the relationship request includes properly formatted data items that are used in establishing the payment agreement between the merchant and the user;

based on the verifying, establishing the payment agreement at a payment service provider that defines terms of a payment relationship between the merchant and the user prior to any transactions between the merchant and the user, the payment agreement between the merchant and the user being established in response to receiving, from the user, the relationship request to establish the payment agreement, the establishing of the payment agreement including linking the payment agreement with a payment account of the merchant or user maintained at the payment service provider server, the payment service provider being a separate entity from the merchant;

after establishing the payment agreement, receiving, at the payment service provider server, a payment request associated with a transaction from the merchant, the payment request including a unique identifier to identify the payment agreement established between the merchant and the user and stored in data storage at the payment service provider server prior to any transactions between the merchant and the user;

verifying, by the payment service provider server, that the payment request complies with the terms of the payment relationship between the merchant and the user established prior to any transactions between the merchant and the user, the verifying including accessing the terms of the payment relationship stored in the data storage at the payment service provider server; and based on the verifying that the payment request complies with the terms of the payment relationship between the merchant and the user established prior to any transactions between the merchant and the user, automatically and without user intervention, processing the payment request by the payment service provider server, the receiving of the payment request, verifying that the payment request complies with the terms, and automatically processing being triggered in response to a single action performed at a device of the user.

18. The machine-readable storage medium of claim 17, wherein the payment agreement defines terms including an authority granted by the user to the payment service provider to make payments to the merchant on behalf of the user.

19. A system comprising:

a communications module of a specially configured payment service provider server to receive, via a programmatic interface from a merchant server specially configured to communicate using API calls with the specially configured payment service provider server, an API call triggered in response to a selection of a link to establish a payment agreement on an interface presented to a device of a user, the API call including a relationship request to establish the payment agreement between a merchant and the user with a payment service provider prior to any transactions between the merchant and the user, the relationship request being verified as including properly formatted data items that are used in establishing the payment agreement between the merchant and the user, the payment agreement defining terms of a payment relationship between the merchant and the user, the payment service provider being a separate entity from the merchant;

at least one hardware processor configured by a management module to establish, at the payment service provider server, the payment agreement in response to the relationship request to establish the payment agreement; and a payment processing module of the specially configured payment service provider server to:

process a payment in response to the communications module receiving a payment request from the merchant, the payment request including the unique identifier to identify the payment agreement established and stored at the payment service provider server prior to any transactions between the merchant and the user, verify that the payment request complies with the terms of the payment relationship between the merchant and the user established prior to any transactions between the merchant and the user, a verification that the payment request complies includes accessing the terms of the payment relationship stored at the payment service provider server;

automatically, without user intervention, processing the payment request based on a verification of the payment request complying with the terms of the payment relationship between the merchant and the user established prior to any transactions between the merchant and the user, the payment processing module to verify that the payment request complies with the terms and automatically process in response to a single action performed at a device of the user.

20. The system of claim 19, wherein the relationship request to establish the payment agreement and the payment request are digitally signed and encrypted by a server, and the communications module includes:

a authentication module to authenticate the digitally signed relationship request and the digitally signed payment request; and an encryption module to decrypt the encrypted relationship request and the encrypted payment request.

\* \* \* \* \*